United States Patent [19]

Driessen et al.

[11] Patent Number: 4,501,799
[45] Date of Patent: Feb. 26, 1985

[54] COMPOSITE BODY FOR GAS DISCHARGE LAMP

[75] Inventors: Antonius J. G. C. Driessen; Eise B. Geertsema; Joris J. C. Oomen; Jan W. Rouwendal, all of Eindhoven, Netherlands

[73] Assignee: U.S. Philips Corporation, New York, N.Y.

[21] Appl. No.: 355,964

[22] Filed: Mar. 8, 1982

[30] Foreign Application Priority Data

Mar. 11, 1981 [NL] Netherlands ............... 8101177

[51] Int. Cl.³ ............................................. E05C 7/06
[52] U.S. Cl. ...................................... 428/446; 313/636; 428/469; 428/679; 428/701
[58] Field of Search ............... 428/446, 469, 679, 701; 313/221; 501/152

[56] References Cited

PUBLICATIONS

International published application WO79/00220; May 3, 1979; Hing et al.; "Heat Resistant Sealing Materials".

Primary Examiner—Marion E. McCamish
Attorney, Agent, or Firm—Norman N. Spain

[57] ABSTRACT

Composite body, a gas discharge lamp having a sodium pressure from 300–600 torr in particular, having an envelope of densely sintered aluminium oxide or of other sodium vapor-resistant materials and a feed-through member of tantalum, niobium or other metals equivalent thereto, the bonding material consisting of a finely dispersed polycrystalline product having a composition in mole % between the following limits:

$Al_2O_3$—5–70 at least one oxide chosen from $Sc_2O_3$ and $Ti_2O_x$, wherein $2 < x < 4$—2–70 and at least one oxide chosen from:

$Y_2O_3$, $Gd_2O_3$, $Tb_2O_3$, $Dy_2O_3$, $Ho_2O_3$, $Er_2O_3$, $Eu_2O_3$, $Pr_2O_3$, $Ce_2O_3$, $Sm_2O_3$, $Tm_2O_3$, $Yb_2O_3$, $Lu_2O_3$, $La_2O_3$ and $Nd_2O_3$—10–80.

7 Claims, 2 Drawing Figures

COMPOSITE BODY FOR GAS DISCHARGE LAMP

BACKGROUND OF THE INVENTION

The invention relates to a composite body formed from two or more parts, at least one of which consists of an oxidic material which may be bonded to one or more parts of a metallic material or a mixture thereof with a metal oxide (cermet), the oxidic material being chosen from densely sintered aluminium oxide (dga), rare earth perowskites of the type $ABO_3$, wherein A represents La, Ce, Pr, Nd or a mixture thereof and B represents: Al, Sc, Lu or a mixture thereof, garnets of the type $A_3Al_5O_{12}$, wherein A is Mg, Li or Y, or sapphire, and the metallic part being chosen from tantalum, niobium, tungsten, molybdenum, alloys having one of these metals as the main component and alloys having iron, nickel or cobalt as the main component, molybdenum-silicon alloys, titanium boride and titanium nitride, which parts are bonded together in a gas-tight and vacuum-tight manner with a bonding material, the bonding material containing aluminum oxide and at least one oxide of a rare earth metal.

The invention particularly relates to a gas discharge lamp the envelope of which consists of the above-mentioned densely sintered aluminum oxide, which lamp comprises an electrode feed-through of niobium and contains sodium vapour or a metal halide vapour as the gas filling during operation. Densely sintered aluminum oxide is a material which is perfectly suitable for this purpose as it is resistant to the action of sodium vapour and to the action of metal halides, even at temperatures as high as 1200° C.

German Patent Specification 17 71 143 (U.S. Pat. No. 3,926,603) discloses a material for bonding bodies of densely sintered aluminum oxide to each other and to metal bodies, this material having the following composition expressed in % by weight:

CaO—24-50
$Al_2O_3$—35-57.5
MgO—0-12
BaO—0-16
$Y_2O_3$—0-10
$B_2O_3$—0-9
$ZrO_2$—0-17,5
$Li_2O$—0-3 the sum ($B_2O_3+ZrO_2+Li_2O$) being between 3 and 20% by weight.

This vitreous composition is devitrified, preferably after having been applied in the sealing seam, by a thermal treatment to a fine-crystalline product which especially in this state is resistant to attack by sodium vapour at temperature up to approximately 900° C.

Because of the fact that a white light-emitting sodium vapour discharge lamp has been developed in which a sodium pressure of 300–600 torr is used, which is realised by a higher temperature of the coldest spot in the discharge lamp, the need has now arisen for a material which is resistant to sodium and sodium aluminate up to temperatures of approximately 1000° C. and which is suitable for use as a sealing material at a temperature lower than 1750° C., preferably lower than 1650° C.

It has been found that the prior art bonding material on the basis of alkaline earth aluminate is not sufficiently resistant to the corrosive action of sodium atoms and sodium ions. In the above-mentioned, novel discharge lamp the bonding material is exposed at a temperature of 850°–950° C. to sodium vapour having a vapour pressure of 300–600 torr and to liquid sodium in the form of an amalgam. In addition, the bonding material is also exposed to contact with sodium ions originating from a sodium-$\beta$-aluminate layer formed during operation. All this results in the formation of unwanted compounds by ion exchange which shorten the life of the bond and consequently of the lamp to an impermissible extent.

SUMMARY OF THE INVENTION

The invention has for its object to provide a class of bonding materials which are capable of resisting the unwanted highly corrosive action of the lamp filling and by means of which the seal in the composite body can be made at a temperature of not more than 1750° C. This makes it possible to produce a high-pressure sodium vapour discharge lamp having an operating life of an acceptable duration.

According to the invention, the composite body is characterized in that the bonding material consists of a finely dispersed polycrystalline product comprising at least three oxidic components and whose composition is within the following limits in mole %:

$Al_2O_3$—5-70
at least one oxide chosen from $Sc_2O_3$ and $Ti_2O_x$ wherein $2<x<4$—2-70
and at least one oxide chosen from:
$Y_2O_3$, $Gd_2O_3$, $Tb_2O_3$, $Dy_2O_3$, $HO_2O_3$, $Er_2O_3$, $Eu_2O_3$, $Pr_2O_3$, $Ce_2O_3$, $Sm_2O_3$, $Tm_2O_3$, $Yb_2O_3$, $Lu_2O_3$, $La_2O_3$ and $Nd_2O_3$—10-80.

The bonding material may comprise 0–20 mole % of a crystal growth-inhibiting oxide to make sure that no coarse cristallisation occurs. Such coarse cristallisation sometimes causes cracks at the crystalline boundaries. Suitable examples of such oxides are $ZrO_2$, $B_2O_3$, $SiO_2$, $P_2O_5$ or alkaline earth oxides such as MgO, BaO and SrO or combinations thereof, the choice depending on the basic composition of the bonding material. The effect of some of these admixtures is known per se, for example from the WO-PA 79/00220. The effect of others is new.

Preference should be given to SrO, BaO or a mixture thereof, which in some compositions result in a very fine crystal structure.

In accordance with a further embodiment of the invention the bonding material also contains two oxides from the group of rare earth elements including $La_2O_3$ and $Y_2O_3$, one oxide of a metal having an ion radius $\leq 0.91$ Å and one oxide of a metal having a ion radius $\geq 0.92$ Å.

The following Table I shows the ion radii of the trivalent ions which are suitable for use.

| ion | ion radius Å | crystal lattice oxide | ion | ion radius Å | crystal lattice oxide |
|---|---|---|---|---|---|
| $Y^{3+}$ | 0.89 | cubic | $La^{3+}$ | 1.06 | hexagonal |
| $Dy^{3+}$ | 0.91 | mono-clinic/cub. | $Ce^{3+}$ | 1.03 | hexagonal |
|  |  |  | $Pr^{3+}$ | 1.01 | hexagonal |
| $Ho^{3+}$ | 0.89 | cubic | $Nd^{3+}$ | 1.00 | hexagonal |
| $Er^{3+}$ | 0.88 | cubic | $Sm^{3+}$ | 0.96 | monoclinic/cubic |
| $Tm^{3+}$ | 0.87 | cubic | $Eu^{3+}$ | 0.95 | monoclinic/cubic |
| $Yb^{3+}$ | 0.86 | cubic | $Gd^{3+}$ | 0.94 | monoclinic/cubic |
| $Lu^{3+}$ | 0.85 | cubic | $Tb^{3+}$ | 0.92 |  |

The combination $3Sc_2O_3.3Ln_2O_3.10Al_2O_3$ provides a melting temperature below 1700° C. if $Ln_2O_3$ has a cation radius $r_i \geq 0.95$ Å. If $Sc_2O_3$ and $Ln_2O_3$ are partly replaced by rare earth oxides having a relative small cation radius, for example by $Y_2O_3$, or by $Ti_2O_3$, then this may cause the melting point to be reduced in many cases.

In accordance with a further embodiment of a variant of the invention there are within the system $Al_2O_3$—$Ti_2O_x$—$Ln_2O_3$ two ranges of compositions of bonding materials, which because of the low melting range sinter very readily, more specifically the ranges of compositions in a molar percentage:

$Ti_2O_x$—40–50
$Ln_2O_3$—15–25 and
$Al_2O_3$—30–40, and $Ti_2O_x$—15–25
$Ln_2O_3$—10–20 and
$Al_2O_3$—60–70

Ln represents in both cases one or more rare earth metals, namely in sequence of preference in the first case $Sm>Gd>Tb>Ge>Y$ and in the second case $Sm>Gd>Tb$.

By means of these bonding materials the composite body of the invention can be produced at a comparatively low temperature.

DESCRIPTION OF THE PREFERRED EMBODIMENTS

Example 1

Figure 1:
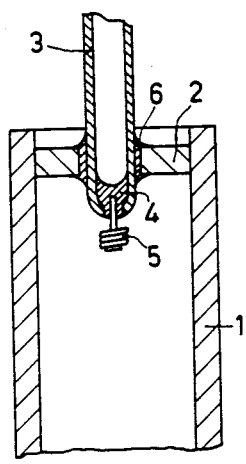
FIG. 1 is a cross-sectional view of one end of a high-pressure sodium vapor discharge lamp employing the composite body construction of the invention.

As a starting material for the bond to be made in order to obtain a composite body in accordance with the invention, a number of compositions are melted to form a vitreous compound and a vitreous compound with small crystals, respectively in a high-frequency oven, the compound is ground to powder and subsequently, after the addition of a binder, rings are pressed from the compound and sintered.

The starting material consists of an oxide mixture chosen from aluminium oxide having a purity of 99.8%, scandium oxide, gadolinium oxide, praseodymium oxide, terbium oxide, samarium oxide, yttrium oxide, lanthanum oxide, cerium oxide, neodymium oxide, also having a purity of 99.8% and titanium (III)-oxide and/or titanium (IV)-oxide having a purity above 99.995%. The melting temperatures (Tm) vary from 1600°–1750° C. The following Tables show a number of compositions.

Table II shows a number of ternary compositions of $Al_2O_3$, $Sc_2O_3$ and a rare earth metal oxide, Table III shows a number of quaternary compositions and Table IV shows some ternary compositions of $Al_2O_3$, $Gd_2O_3$ and $Ti_2O_x$, wherein x is varied from 2 to 4, and a number of ternary compositions with other rare earth metal oxides instead of $Gd_2O_3$.

Table V describes some ternary and quaternary compositions with $Ti_2O_3$.

Finally, Table VI describes different compositions, some of which contain a crystal growth-inhibiting admixture in accordance with a preferred embodiment.

TABLE II

| No | $Al_2O_3$ | $Sc_2O_3$ | $Ce_2O_3$ | $Pr_2O_3$ | $Y_2O_3$ | $Tb_2O_3$ | $Sm_2O_3$ | $Nd_2O_3$ | $Eu_2O_3$ | Tm (°C.) |
|---|---|---|---|---|---|---|---|---|---|---|
| 1 | 55 | 27 | 18 | | | | | | | 1640 |
| 2 | 65 | 17.5 | | 17.5 | | | | | | 1655 |
| 3 | 65 | 28 | | | 7 | | | | | 1745 |
| 4 | 65 | 10.5 | | | | 24.5 | | | | 1735 |
| 5 | 65 | 21 | | | | | 14 | | | 1610 |
| 6 | 70 | 15 | | | | | | 15 | | 1700 |
| 7 | 65 | 17.5 | | | | | | 17.5 | | 1640 |
| 8 | 70 | 15 | 15 | | | | | | | 1635 |
| 9 | 65 | 17.5 | 17.5 | | | | | | | 1610 |
| 10 | 60 | 24 | 16 | | | | | | | 1635 |
| 11 | 65 | 17.5 | | | | | 17.5 | | | 1600 |
| 12 | 70 | 15 | | | | | 15 | | | 1620 |
| 13 | 70 | 9 | | | | | | | 21 | 1660 |

TABLE III

| No | $Al_2O_3$ | $Sc_2O_3$ | $Y_2O_3$ | $Nd_2O_3$ | $La_2O_3$ | $Ce_2O_3$ | Tm (°C.) |
|---|---|---|---|---|---|---|---|
| 14 | 60 | 14 | 10 | 16 | | | 1620 |
| 15 | 60 | 22 | 6 | | 12 | | 1623 |
| 16 | 60 | 18 | 6 | | 16 | | 1630 |
| 17 | 65 | 12.25 | 5.25 | | 17.5 | | 1635 |
| 18 | 65 | 15.75 | 5.25 | | | 14 | 1615 |
| 19 | 65 | 8.75 | 5.25 | 21 | | | 1615 |
| 20 | 65 | 19.25 | 5.25 | 10.5 | | | 1645 |
| 21 | 70 | 7.5 | 4.5 | 18 | | | 1635 |
| 22 | 70 | 10.5 | 7.5 | 12 | | | 1610 |
| 23 | 55 | 24.75 | 6.75 | | | 13.50 | 1630 |
| 24 | 55 | 20.25 | 6.75 | | | 18 | 1630 |
| 25 | 55 | 15.75 | 11.25 | 18 | | | 1660 |
| 26 | 65 | 19.25 | 5.25 | | 10.5 | | 1620 |
| 27 | 66 | 8.5 | 8.5 | 17 | | | 1595 |
| 28 | 70 | 4.5 | 10.5 | | 15 | | 1660 |

TABLE IV

| | No. | $Al_2O_3$ | $Ti_2O_x$ | $La_2O_3$ | $Ce_2O_3$ | $Sm_2O_3$ | $Gd_2O_3$ | Ts (°C.) |
|---|---|---|---|---|---|---|---|---|
| $Ti_2O_3$ | 29 | 41.7 | 33.3 | | | | 25.0 | 1700 |
| | 30 | 42.0 | 40.0 | | | | 18.0 | 1635 |
| | 31 | 37.5 | 40.0 | | | | 22.5 | 1720 |
| | 32 | 40.0 | 42.0 | | | | 18.0 | 1595 |
| | 33 | 50.0 | 40.0 | | | | 10.0 | 1615 |
| | 34 | 10.0 | 18.0 | 72.0 | | | | 1690 |
| | 35 | 40.0 | 42.0 | 18.0 | | | | 1615 |

TABLE IV-continued

| | No. | Al₂O₃ | Ti₂O₃ | Gd₂O₃ | Yb₂O₃ | Y₂O₃ | Sc₂O₃ | Ce₂O₃ | Tm (°C.) |
|---|---|---|---|---|---|---|---|---|---|
| | 36 | 10.0 | 27.0 | 63.0 | | | | | 1685 |
| | 37 | 30.0 | 49.0 | 21.0 | | | | | 1625 |
| | 38 | 40.0 | 42.0 | 18.0 | | | | | 1590 |
| | 39 | 10.0 | 63.0 | | 27.0 | | | | 1640 |
| | 40 | 20.0 | 56.0 | | 24.0 | | | | 1575 |
| | 41 | 30.0 | 49.0 | | 21.0 | | | | 1565 |
| | 42 | 40.0 | 42.0 | | 18.0 | | | | 1560 |
| | 43 | 50.0 | 35.0 | | 15.0 | | | | 1590 |
| | 44 | 60.0 | 20.0 | | 20.0 | | | | 1605 |
| | 45 | 70.0 | 21.0 | | 9.0 | | | | 1610 |
| | 46 | 30.0 | 49.0 | | | 21.0 | | | 1585 |
| | 47 | 40.0 | 42.0 | | | 18.0 | | | 1595 |
| Ti₂O₃.₃₃ | 48 | 46.7 | 33.3 | | | 20.0 | | | 1620 |
| | 49 | 41.7 | 33.3 | | | 25.0 | | | 1670 |
| | 50 | 41.25 | 33.75 | | | 25.0 | | | 1600 |
| | 51 | 36.7 | 33.3 | | | 30.0 | | | 1670 |
| | 52 | 45.05 | 27.65 | | | 27.3 | | | 1600 |
| Ti₂O₃.₅ | 53 | 42.0 | 40.0 | | | 18.0 | | | 1615 |
| Ti₂O₄ | 54 | 46.7 | 33.3 | | | 20.0 | | | 1590 |

| | No. | Al₂O₃ | Ti₂O₃ | Gd₂O₃ | Yb₂O₃ | Y₂O₃ | Sc₂O₃ | Ce₂O₃ | Tm (°C.) |
|---|---|---|---|---|---|---|---|---|---|
| | 55 | 41.25 | 33.75 | 18.75 | 6.25 | | | | 1665 |
| | 56 | 41.25 | 33.75 | 12.50 | 12.50 | | | | 1690 |
| | 57 | 41.25 | 33.75 | 6.25 | 18.75 | | | | 1710 |
| | 58 | 65.5 | 17.5 | | | 17.0 | | | 1745 |
| | 59 | 60.5 | 24.0 | | | 15.5 | | | 1735 |
| | 60 | 56.0 | 29.5 | | | 14.5 | | | 1710 |
| | 61 | 52.0 | 34.5 | | | 13.5 | | | 1715 |
| | 62 | 65.0 | 5.25 | | | | 22.75 | 7.0 | 1665 |
| | 63 | 65.0 | 5.25 | | | | 19.75 | 10.5 | 1630 |
| | 64 | 65.0 | 8.75 | | | | 15.75 | 10.5 | 1645 |
| | 65 | 65.0 | 12.25 | | | | 12.25 | 10.5 | 1630 |
| | 66 | 65.0 | 12.25 | | | | 8.75 | 14.0 | 1625 |
| | 67 | 65.0 | 12.25 | | | | 5.25 | 17.5 | 1655 |

TABLE VI

| | composition in mole % | | | | | | | | | crystal growth inhibitor | | |
|---|---|---|---|---|---|---|---|---|---|---|---|---|
| No. | Al₂O₃ | Sc₂O₃ | Y₂O₃ | La₂O₃ | Nd₂O₃ | Ce₂O₃ | Gd₂O₃ | Ti₂Oₓ | | | | Tm (°C.) |
| 68 | 63.7 | 18.86 | 5.15 | 10.29 | | | | | | MgO | 2.0 | 1630 |
| 69 | 62.5 | 8.15 | 4.10 | 8.56 | | | | | | MgO | 16.69 | 1735 |
| 70 | 63.25 | 17.0 | 4.50 | 9.25 | | | | | | SrO | 6.0 | 1620 |
| 71 | 63.25 | 7.75 | 7.75 | | 15.25 | | | | | SrO | 6.0 | 1680 |
| 72 | 59.40 | 15.90 | 4.10 | 8.60 | | | | | | SrO | 12.0 | 1605 |
| 73 | 59.50 | 7.15 | 7.15 | | 14.20 | | | | | SrO | 12.0 | 1700 |
| 74 | 59.40 | 15.90 | 4.10 | 8.60 | | | | | | CaO | 12.0 | 1535 |
| 75 | 59.50 | 7.15 | 7.15 | | 14.20 | | | | | CaO | 12.0 | 1665 |
| 76 | 59.40 | 15.90 | 4.10 | 8.60 | | | | | | BaO | 12.0 | 1585 |
| 77 | 59.50 | 7.15 | 7.15 | | 14.20 | | | | | BaO | 12.0 | 1700 |
| 78 | 64.7 | 8.33 | 8.33 | | 16.66 | | | | | MgO | 2.0 | 1610 |
| 79 | 63.7 | 17.15 | | | | 17.15 | | | | MgO | 2.0 | 1620 |
| 80 | 40.23 | | | | | | 24.38 | Ti₂O₃ | 32.9 | P₂O₅ | 2.49 | 1615 |
| 81 | 40.21 | | | | | | 24.37 | Ti₂O₃.₃₃ | 32.9 | P₂O₅ | 2.52 | 1600 |
| 82 | 59.4 | 15.9 | 4.1 | 8.60 | | | | | | ZrO₂ | 12.0 | 1615 |
| 83 | 59.5 | 7.15 | 7.15 | | 14.2 | | | | | ZrO₂ | 12.0 | 1700 |
| 84 | 61.75 | 18.29 | 4.99 | 9.98 | | | | | | SiO₂ | 5.0 | 1565 |
| 85 | 55.25 | 16.36 | 4.46 | 8.92 | | | | | | SiO₂ | 15.0 | 1528 |
| 86 | 52.0 | 15.4 | 4.2 | 8.40 | | | | | | SiO₂ | 20.0 | 1495 |
| 87 | 62.7 | 8.08 | 8.08 | | 16.15 | | | | | SiO₂ | 5.0 | 1640 |
| 88 | 56.1 | 7.22 | 7.22 | | 14.45 | | | | | SiO₂ | 15.0 | 1573 |
| 89 | 52.8 | 6.8 | 6.8 | | 13.6 | | | | | SiO₂ | 20.0 | 1550 |
| 90 | 39.2 | | 10.8 | | | | | Ti₂O₃ | 50.0 | | | 1670 |
| 91 | 56.0 | | 14.5 | | | | | Ti₂O₃ | 29.5 | | | 1710 |
| 92 | 65.0 | 9.15 | 2.60 | 5.25 | | | | | | SrO | 18.0 | 1660 |
| 93 | 65.0 | 4.25 | 4.25 | | 8.50 | | | | | SrO | 18.0 | 1630 |
| 94 | 65.0 | 9.15 | 2.60 | 5.25 | | | | BaO | 18.0 | | 1660 | |
| 95 | 65.0 | 4.25 | 4.25 | | 8.50 | | | | | BaO | 18.0 | 1650 |

By means of the above-mentioned bonding materials bonds are made between molybdenum and density sintered aluminum oxide (dga), niobium and dga, tantalum and dga and two dga parts together, and bonds of peroskites of the type ABO₃, garnets of the type A₃Al₅O₁₂, sapphire, together and to the said metals.

Example 2

Figure 2:
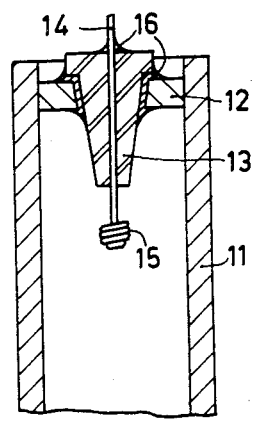
FIG. 2 is a cross-sectional view of one end of another high-pressure sodium vapor discharge lamp employing the composite body construction of the invention.

A discharge vessel for a high-pressure sodium lamp with mercury vapour addition has at both ends a construction as shown in FIG. 1 or FIG. 2. The lamp which is known per se from inter alia U.S. Pat. No. 3,716,743 will not be further described here.

In FIG. 1, the discharge vessel consists of a tube 1 of dga and a ring 2, also of dga. A niobium tube 3 is sealed in a vacuum-tight manner in the ring. The tungsten filament 5, which serves as an electrode is sealed in the tube 3 by means of titanium (4). The tube 3 and the ring 2 are bonded together in a vacuum-tight manner by means of bonding material 6 having one of the compositions 26, 68, 69, 70, 27, 76, 72, 92, 93, 94, 95, 78, 9, 79, 42, 44, 45, 80, 81, 90 and 91 of the preceding Tables.

The construction shown in FIG. 2 comprises a tube 11, a plug 13 and a ring 12, all made of dga. A solid niobium pin 14 is passed through the plug 13. The spiralized tungsten electrode 15 is attached to the end of said pin 14. By means of a bonding material 16 having one of the above-mentioned compositions, the parts are bonded together in a vacuum-tight manner, starting from pressed rings.

The sealing process is performed as follows. First the parts to be bonded are heated, with sealing material provided between them, from room temperature in 15 sec. to 1250° C. in an oven, kept at this temperature for 60 sec., thereafter heated in 30 sec. to a temperature Ts which is 50° C. above the melting temperature (Tm) and kept at this temperature for 20 sec. Thereafter the assembly is allowed to cool in the oven to 1250° C. which temperature is maintained for 120 sec., allowed to cool thereafter in the oven to 1125° C. which temperature is maintained for 60 sec. whereafter the assembly is allowed to cool to room temperature in the switched-off oven.

Lamps comprising discharge vessels thus produced and having the customary filling of sodium vapour or metal halide and mercury vapour as the case may be were life-tested by igniting them and keeping them at the operating voltage. After 100 hours the luminous intensity of none of the lamps had decreased. The best results were obtained with lamps with a bonding material in accordance with the compositions nos. 76, 72, 92, 93, 94 and 95.

What is claimed is:

1. A composite body formed from two or more parts, at least one of which consists of an oxidic material, which which oxidic material is bonded to one or more parts of e metallic material or a mixture thereof with a metal oxide (cermet), the oxidic material being chosen from densely sintered aluminum oxide (dga), rare earth perowskites of the types $ABO_3$ wherein A represents La, Ce, Pr, Nd, or a mixture thereof and B represents: Al, Sc, Lu or a mixture thereof, garnets of the type $A_3Al_5O_{12}$, wherein A is Mg, Li or Y, or sapphire, and the metallic part being chosen from tantalum, niobium, tungsten, molybdenum, alloys having one of these metals as the main component and alloys having iron, nickel or cobalt as the main component, molybdenum-silicon alloys, titanium boride and titanium nitride, which parts are bonded together in a gas and vacuum-tight manner with a bonding material, the bonding material containing aluminum oxide and at least one oxide of a rare earth metal, characterized in that the bonding material consists of a finely dispersed polycrystalline product comprising at least three oxidic components and whose composition is within the following limits in mole %

$Al_2O_3$—5–70 at least one oxide chosen from $Sc_2O_3$ and $Ti_2O_x$, wherein $2 < x < 4$—2–70 at least one oxide chosen from $Y_2O_3$, $Gd_2O_3$, $Tb_2O_3$, $Dy_2O_3$, $Ho_2O_3$, $Er_2O_3$, $Eu_2O_3$, $Pr_2O_3$, $Ce_2O_3$, $Sm_2O_3$, $Tm_2O_3$, $Yb_2O_3$, $Lu_2O_3$, $La_2O_3$ and $Nd_2O_3$—7–80 and one or more oxides chosen from $ZrO_2$, $B_2O_3$, $SiO_2$, $P_2O_5$, $MgO$, $SrO$, $BaO$ and $CaO$—0–20.

2. A composite body as claimed in claim 1, characterized in that the polycrystalline product comprises SrO, BaO or a mixture thereof.

3. A composite body as claimed in claim 1 or 2, characterized in that the bonding material contains two oxides from the group of rare earth metals including $La_2O_3$ and $Y_2O_3$, one oxide of a metal having ion radius $\leq 0.91$ Å and one oxide of a metal having ion radius $\geq 0.92$ Å.

4. A composite body as claimed in claim 1 or 2, characterized in that the bonding material corresponds to a molar ratio of $3Sc_2O_3 \cdot 3Ln_2O_3 \cdot 10Al_2O_3$, wherein Ln is at least partly a rare earth element having ion radius $\geq 0.95$ Å.

5. A composite body as claimed in claim 1, characterized in that the bonding material has a composition within the following range of composition in mole %

$Ti_2O_x$—40–50

$Ln_2O_3$—15–25 and $Al_2O_3$—30–40 wherein Ln represents one or more rare earth metals in the sequence of preference $Sm > Gd > Tb > Ce > Y$.

6. A composite body as claimed in claim 1, characterized in that the bonding material has a composition within the following range of composition in mole %

$Ti_2O_x$—15–25

$Ln_2O_3$—10–20 and $Al_2O_3$—60–70 wherein Ln represents one or more rare earth metals in the sequence of preference $Sm > Gd > Tb$.

7. A gas discharge lamp having an envelope of densely sintered aluminum oxide, an electrode feed-through member of niobium, a gas filling consisting during operation of sodium vapour, the aluminum oxide envelope parts being bonded together and to the niobium feed-through member by means of bonding material so as to constitute a composite body as claimed in claim 1.

* * * * *

UNITED STATES PATENT AND TRADEMARK OFFICE
CERTIFICATE OF CORRECTION

PATENT NO. : 4,501,799

DATED : February 26, 1985

INVENTOR(S) : ANTONIUS J.G.C. DRIESSEN ET AL

It is certified that error appears in the above—identified patent and that said Letters Patent is hereby corrected as shown below:

In the claims:

Column 7, line 44, "e" should be --a--.

Signed and Sealed this

Eighteenth Day of June 1985

[SEAL]

Attest:

DONALD J. QUIGG

*Attesting Officer*     *Acting Commissioner of Patents and Trademarks*